(12) United States Patent  
Pervan (10) Patent No.: US 7,137,229 B2
(45) Date of Patent: Nov. 21, 2006

(54) FLOORBOARDS WITH DECORATIVE GROOVES

(75) Inventor: Darko Pervan, Viken (SE)

(73) Assignee: Valinge Innovation AB, Viken (SE)

( * ) Notice: Subject to any disclaimer, the term of this patent is extended or adjusted under 35 U.S.C. 154(b) by 0 days.

(21) Appl. No.: 10/413,566

(22) Filed: Apr. 15, 2003

(65) Prior Publication Data

US 2004/0035078 A1 Feb. 26, 2004

Related U.S. Application Data

(63) Continuation-in-part of application No. PCT/SE02/01731, filed on Sep. 20, 2002.

(60) Provisional application No. 60/372,082, filed on Apr. 15, 2002.

(51) Int. Cl.
*B44F 9/00* (2006.01)
*E04F 13/08* (2006.01)
*E04B 2/08* (2006.01)
*B32B 3/14* (2006.01)

(52) U.S. Cl. .................. 52/313; 52/390; 52/589.1; 428/50

(58) Field of Classification Search .................. 52/313, 52/311.2, 589.1, 591.1, 592.1, 316, 541, 390; 428/50

See application file for complete search history.

(56) References Cited

U.S. PATENT DOCUMENTS

| 213,740 | A | 4/1879 | Conner |
|---|---|---|---|
| 714,987 | A | 12/1902 | Wolfe |
| 753,791 | A | 3/1904 | Fulghum |
| 1,124,228 | A | 1/1915 | Houston |
| 1,194,636 | A | 8/1916 | Joy |
| 1,371,856 | A | 3/1921 | Cade |
| 1,407,679 | A | 2/1922 | Ruthrauff |
| 1,454,250 | A | 5/1923 | Parsons |
| 1,468,288 | A | 9/1923 | Een |
| 1,477,813 | A | 12/1923 | Daniels et al. |
| 1,510,924 | A | 10/1924 | Daniels et al. |
| 1,540,128 | A | 6/1925 | Houston |
| 1,575,821 | A | 3/1926 | Daniels |
| 1,602,256 | A | 10/1926 | Sellin |
| 1,602,267 | A | 10/1926 | Karwisch |
| 1,615,096 | A | 1/1927 | Meyers |
| 1,622,103 | A | 3/1927 | Fulton |
| 1,622,104 | A | 3/1927 | Fulton |
| 1,637,634 | A | 8/1927 | Carter |
| 1,644,710 | A | 10/1927 | Crooks |
| 1,660,480 | A | 2/1928 | Daniels |
| 1,714,738 | A | 5/1929 | Smith |
| 1,718,702 | A | 6/1929 | Pfiester |
| 1,734,826 | A | 11/1929 | Pick |
| 1,764,331 | A | 6/1930 | Moratz |
| 1,778,069 | A | 10/1930 | Fetz |
| 1,787,027 | A | 12/1930 | Wasleff |

(Continued)

FOREIGN PATENT DOCUMENTS

AU 713628 1/1998

(Continued)

OTHER PUBLICATIONS

Webster's Dictionary, Random House: New York (1987), p. 862.

(Continued)

*Primary Examiner*—Peter M. Cuomo
*Assistant Examiner*—Sarah B. McPartlin
(74) *Attorney, Agent, or Firm*—Buchanan Ingersoll (57) ABSTRACT

Floorboards consisting of a core and a surface layer with decorative joint edge portions which are formed by removing the surface layer.

24 Claims, 9 Drawing Sheets

U.S. PATENT DOCUMENTS

| | | |
|---|---|---|
| 1,790,178 A | 1/1931 | Sutherland, Jr. |
| 1,823,039 A | 9/1931 | Gruner |
| 1,859,667 A | 5/1932 | Gruner |
| 1,898,364 A | 2/1933 | Gynn |
| 1,906,411 A | 5/1933 | Potvin |
| 1,929,871 A | 10/1933 | Jones |
| 1,940,377 A | 12/1933 | Storm |
| 1,953,306 A | 4/1934 | Moratz |
| 1,986,739 A | 1/1935 | Mitte |
| 1,988,201 A | 1/1935 | Hall |
| 2,044,216 A | 6/1936 | Klages |
| 2,266,464 A | 12/1941 | Kraft |
| 2,276,071 A | 3/1942 | Scull |
| 2,324,628 A | 7/1943 | Kahr |
| 2,398,632 A * | 4/1946 | Frost et al. ............... 428/309.9 |
| 2,430,200 A | 11/1947 | Wilson |
| 2,495,862 A | 1/1950 | Osborn |
| 2,740,167 A | 4/1956 | Rowley |
| 2,780,253 A | 2/1957 | Joa |
| 2,851,740 A | 9/1958 | Baker |
| 2,894,292 A * | 7/1959 | Gramelspacher ............. 52/474 |
| 2,947,040 A | 8/1960 | Schultz |
| 3,045,294 A | 7/1962 | Livezey, Jr. |
| 3,100,556 A | 8/1963 | De Ridder |
| 3,125,138 A | 3/1964 | Bolenbach |
| 3,182,769 A | 5/1965 | De Ridder |
| 3,200,553 A | 8/1965 | Frashour et al. |
| 3,203,149 A | 8/1965 | Soddy |
| 3,267,630 A | 8/1966 | Omholt |
| 3,282,010 A | 11/1966 | King, Jr. |
| 3,301,147 A | 1/1967 | Clayton et al. |
| 3,310,919 A | 3/1967 | Bue et al. |
| 3,347,048 A | 10/1967 | Brown et al. |
| 3,387,422 A | 6/1968 | Wanzer |
| 3,460,304 A | 8/1969 | Braeuninger et al. |
| 3,481,810 A | 12/1969 | Waite |
| 3,526,420 A | 9/1970 | Brancalcone |
| 3,538,665 A | 11/1970 | Gohner |
| 3,548,559 A | 12/1970 | Levine |
| 3,553,919 A | 1/1971 | Omholt |
| 3,555,762 A | 1/1971 | Costanzo, Jr. |
| 3,694,983 A | 10/1972 | Couquet |
| 3,714,747 A | 2/1973 | Curran |
| 3,731,445 A | 5/1973 | Hoffmann et al. |
| 3,759,007 A | 9/1973 | Thiele |
| 3,768,846 A | 10/1973 | Hensley et al. |
| 3,786,608 A | 1/1974 | Boettcher |
| 3,859,000 A | 1/1975 | Webster |
| 3,902,293 A | 9/1975 | Witt et al. |
| 3,908,053 A | 9/1975 | Hettich |
| 3,936,551 A | 2/1976 | Elmendorf et al. |
| 3,988,187 A | 10/1976 | Witt et al. |
| 4,037,377 A | 7/1977 | Howell et al. |
| 4,084,996 A | 4/1978 | Wheeler |
| 4,090,338 A | 5/1978 | Bourgade |
| 4,099,358 A | 7/1978 | Compaan |
| 4,100,710 A | 7/1978 | Kowallik |
| 4,169,688 A | 10/1979 | Toshio |
| 4,242,390 A | 12/1980 | Nemeth |
| 4,299,070 A | 11/1981 | Oltmanns et al. |
| 4,304,083 A | 12/1981 | Anderson |
| 4,426,820 A | 1/1984 | Terbrack et al. |
| 4,471,012 A | 9/1984 | Maxwell |
| 4,489,115 A | 12/1984 | Layman et al. |
| 4,501,102 A | 2/1985 | Knowles |
| 4,561,233 A | 12/1985 | Harter et al. |
| 4,567,706 A | 2/1986 | Wendt |
| 4,612,074 A | 9/1986 | Smith et al. |
| 4,612,745 A | 9/1986 | Hovde |
| 4,641,469 A | 2/1987 | Wood |
| 4,643,237 A | 2/1987 | Rosa |
| 4,646,494 A | 3/1987 | Saarinen et al. |
| 4,653,242 A | 3/1987 | Ezard |
| 4,703,597 A | 11/1987 | Eggemar |
| 4,715,162 A | 12/1987 | Brightwell |
| 4,716,700 A * | 1/1988 | Hagemeyer ................. 52/456 |
| 4,738,071 A | 4/1988 | Ezard |
| 4,769,963 A | 9/1988 | Meyerson |
| 4,819,932 A | 4/1989 | Trotter, Jr. |
| 4,831,806 A | 5/1989 | Niese et al. |
| 4,845,907 A | 7/1989 | Meek |
| 4,905,442 A | 3/1990 | Daniels |
| 5,029,425 A | 7/1991 | Bogataj |
| 5,113,632 A | 5/1992 | Hanson |
| 5,117,603 A | 6/1992 | Weintraub |
| 5,148,850 A | 9/1992 | Urbanick |
| 5,165,816 A | 11/1992 | Parasin |
| 5,179,812 A | 1/1993 | Hill |
| 5,216,861 A | 6/1993 | Meyerson |
| 5,253,464 A | 10/1993 | Nilsen |
| 5,271,564 A | 12/1993 | Smith |
| 5,295,341 A | 3/1994 | Kajiwara |
| 5,349,796 A | 9/1994 | Meyerson |
| 5,390,457 A | 2/1995 | Sjolander |
| 5,433,806 A | 7/1995 | Pasquali et al. |
| 5,474,831 A | 12/1995 | Nystrom |
| 5,497,589 A | 3/1996 | Porter |
| 5,502,939 A | 4/1996 | Zadok et al. |
| 5,540,025 A | 7/1996 | Takehara et al. |
| 5,560,569 A | 10/1996 | Schmidt |
| 5,567,497 A | 10/1996 | Zegler et al. |
| 5,570,554 A * | 11/1996 | Searer ........................ 52/539 |
| 5,597,024 A | 1/1997 | Bolyard et al. |
| 5,618,602 A | 4/1997 | Nelson |
| 5,630,304 A | 5/1997 | Austin |
| 5,653,099 A | 8/1997 | MacKenzie |
| 5,671,575 A | 9/1997 | Wu |
| 5,695,875 A | 12/1997 | Larsson et al. |
| 5,706,621 A | 1/1998 | Pervan |
| 5,755,068 A * | 5/1998 | Ormiston .................... 52/314 |
| 5,768,850 A | 6/1998 | Chen |
| 5,797,237 A | 8/1998 | Finkell, Jr. |
| 5,823,240 A | 10/1998 | Bolyard et al. |
| 5,827,592 A | 10/1998 | Van Gulik et al. |
| 5,860,267 A | 1/1999 | Pervan |
| 5,899,038 A | 5/1999 | Stroppiana |
| 5,900,099 A | 5/1999 | Sweet et al. |
| 5,935,668 A | 8/1999 | Smith |
| 5,943,239 A | 8/1999 | Shamblin et al. |
| 5,968,625 A | 10/1999 | Hudson |
| 5,987,839 A | 11/1999 | Hamar et al. |
| 6,006,486 A | 12/1999 | Moriau et al. |
| 6,023,907 A | 2/2000 | Pervan |
| 6,029,416 A | 2/2000 | Andersson |
| 6,094,882 A | 8/2000 | Pervan |
| 6,101,778 A | 8/2000 | Martensson |
| 6,119,423 A | 9/2000 | Costantino |
| 6,134,854 A | 10/2000 | Stanchfield |
| 6,148,884 A | 11/2000 | Bolyard et al. |
| 6,173,548 B1 | 1/2001 | Hamar et al. |
| 6,182,410 B1 | 2/2001 | Pervan |
| 6,203,653 B1 | 3/2001 | Seidner |
| 6,205,639 B1 | 3/2001 | Pervan |
| 6,209,278 B1 | 4/2001 | Tychsen |
| 6,216,403 B1 | 4/2001 | Belbeoc'h |
| 6,216,409 B1 | 4/2001 | Roy et al. |
| 6,247,285 B1 | 6/2001 | Moebus |
| 6,314,701 B1 | 11/2001 | Meyerson |
| 6,324,803 B1 | 12/2001 | Pervan |
| 6,332,733 B1 | 12/2001 | Hamberger et al. |
| 6,339,908 B1 | 1/2002 | Chuang |
| 6,345,481 B1 | 2/2002 | Nelson |
| 6,363,677 B1 | 4/2002 | Chen et al. |
| 6,385,936 B1 | 5/2002 | Schneider |

| | | | | | | |
|---|---|---|---|---|---|---|
| 6,397,547 B1 | 6/2002 | Martensson | | DE | 2 238 660 | 2/1974 |
| 6,421,970 B1 | 7/2002 | Martensson et al. | | DE | 2 252 643 | 5/1974 |
| 6,438,919 B1 | 8/2002 | Knauseder | | DE | 2 502 992 | 7/1976 |
| 6,446,405 B1 | 9/2002 | Pervan | | DE | 2 616 077 | 10/1977 |
| 6,490,836 B1 | 12/2002 | Moriau et al. | | DE | 2 917 025 | 11/1980 |
| 6,505,452 B1 | 1/2003 | Hannig et al. | | DE | 30 41781 A1 | 6/1982 |
| 6,510,665 B1 | 1/2003 | Pervan | | DE | 32 14 207 A1 | 11/1982 |
| 6,516,579 B1 | 2/2003 | Pervan | | DE | 32 46 376 C2 | 6/1984 |
| 6,532,709 B1 | 3/2003 | Pervan | | DE | 33 43 601 A1 | 6/1985 |
| 6,536,178 B1 | 3/2003 | Palsson et al. | | DE | 35 38 538 A1 | 10/1985 |
| 6,584,747 B1 | 7/2003 | Kettler et al. | | DE | 86 04 004 | 6/1986 |
| 6,601,359 B1 | 8/2003 | Olofsson | | DE | 35 12 204 A1 | 10/1986 |
| 6,606,834 B1 | 8/2003 | Martensson et al. | | DE | 35 44 845 A1 | 6/1987 |
| 6,647,690 B1 | 11/2003 | Martensson | | DE | 36 31 390 A1 | 12/1987 |
| 6,672,030 B1 | 1/2004 | Schulte | | DE | 40 02 547 A1 | 8/1991 |
| 6,684,592 B1 | 2/2004 | Martin | | DE | 41 30 115 A1 | 9/1991 |
| 6,722,809 B1 | 4/2004 | Hamberger et al. | | DE | 41 34 452 A1 | 4/1993 |
| 6,786,019 B1 | 9/2004 | Thiers | | DE | 42 15 273 A1 | 11/1993 |
| 2001/0029720 A1 | 10/2001 | Pervan | | DE | 42 42 530 A1 | 6/1994 |
| 2001/0034992 A1 | 11/2001 | Pietzer et al. | | DE | 43 13 037 C1 | 8/1994 |
| 2002/0007608 A1 | 1/2002 | Pervan | | DE | 93 17 191 U1 | 3/1995 |
| 2002/0014047 A1* | 2/2002 | Thiers .................. 52/313 | | DE | 296 10 462 U1 | 10/1996 |
| 2002/0020127 A1 | 2/2002 | Thiers et al. | | DE | 196 01 322 A1 | 5/1997 |
| 2002/0031646 A1 | 3/2002 | Chen et al. | | DE | 296 18 318 U1 | 5/1997 |
| 2002/0046528 A1 | 4/2002 | Pervan et al. | | DE | 297 10 175 U1 | 9/1997 |
| 2002/0069611 A1 | 6/2002 | Leopolder | | DE | 196 51 149 A1 | 6/1998 |
| 2002/0083673 A1 | 7/2002 | Kettler et al. | | DE | 197 09 641 A1 | 9/1998 |
| 2002/0100231 A1* | 8/2002 | Miller et al. .................. 52/177 | | DE | 197 18 319 A1 | 11/1998 |
| 2002/0112433 A1 | 8/2002 | Pervan | | DE | 197 18 812 A1 | 11/1998 |
| 2002/0178673 A1 | 12/2002 | Pervan | | DE | 200 01 225 U1 | 8/2000 |
| 2002/0178674 A1 | 12/2002 | Pervan | | DE | 200 02 744 U1 | 9/2000 |
| 2002/0178682 A1 | 12/2002 | Pervan | | DE | 199 25 248 A1 | 12/2000 |
| 2003/0009972 A1 | 1/2003 | Pervan et al. | | DE | 200 13 380 U1 | 12/2000 |
| 2003/0024199 A1 | 2/2003 | Pervan et al. | | DE | 200 17 461 U1 | 3/2001 |
| 2003/0033777 A1 | 2/2003 | Thiers et al. | | DE | 200 18 284 U1 | 3/2001 |
| 2003/0033784 A1 | 2/2003 | Pervan | | DE | 100 01 248 A1 | 7/2001 |
| 2003/0041545 A1 | 3/2003 | Stanchfield | | DE | 100 32 204 C1 | 7/2001 |
| 2003/0084636 A1 | 5/2003 | Pervan | | DE | 100 44 016 A1 | 3/2002 |
| 2003/0115812 A1 | 6/2003 | Pervan | | EP | 0 248 127 A1 | 12/1987 |
| 2003/0115821 A1 | 6/2003 | Pervan | | EP | 0 623 724 A1 | 11/1994 |
| 2004/0177584 A1 | 9/2004 | Pervan | | EP | 0 652 340 A1 | 5/1995 |
| 2004/0241374 A1 | 12/2004 | Thiers et al. | | EP | 0 665 347 A1 | 8/1995 |
| 2004/0255541 A1 | 12/2004 | Thiers et al. | | EP | 0 690 185 A1 | 1/1996 |
| 2005/0034404 A1 | 2/2005 | Pervan | | EP | 0 698 162 B1 | 2/1996 |
| 2005/0034405 A1 | 2/2005 | Pervan | | EP | 0 843 763 B1 | 5/1998 |
| 2005/0055943 A1 | 3/2005 | Pervan | | EP | 0 849 416 A2 | 6/1998 |
| 2005/0102937 A1 | 5/2005 | Pervan | | EP | 0 855 482 B1 | 7/1998 |
| 2005/0138881 A1 | 6/2005 | Pervan | | EP | 0 877 130 B1 | 11/1998 |
| 2005/0166502 A1 | 8/2005 | Pervan et al. | | EP | 0 958 441 | 11/1998 |
| 2005/0166514 A1 | 8/2005 | Pervan | | EP | 0 903 451 A2 | 3/1999 |
| 2005/0166516 A1 | 8/2005 | Pervan | | EP | 0 969 163 A2 | 1/2000 |
| 2005/0193677 A1 | 9/2005 | Vogel | | EP | 0 969 163 A3 | 1/2000 |
| | | | | EP | 0 969 164 A2 | 1/2000 |
| FOREIGN PATENT DOCUMENTS | | | | EP | 0 969 164 A3 | 1/2000 |
| AU | 200020703 A1 | 6/2000 | | EP | 0 974 713 A1 | 1/2000 |
| BE | 417526 | 9/1936 | | EP | 0 976 889 A1 | 2/2000 |
| BE | 0557844 | 6/1957 | | EP | 1 048 423 A2 | 11/2000 |
| BE | 1010339 A3 | 6/1998 | | EP | 1 251 219 A1 | 7/2001 |
| BE | 1010487 A6 | 10/1998 | | EP | 1 120 515 A1 | 8/2001 |
| CA | 0991373 | 6/1976 | | EP | 1 146 182 A2 | 10/2001 |
| CA | 2226286 | 12/1997 | | EP | 1 223 265 A2 | 7/2002 |
| CA | 2252791 | 5/1999 | | EP | 1 262 609 A1 | 12/2002 |
| CA | 2289309 | 7/2000 | | FI | 843060 | 8/1984 |
| CH | 200949 | 1/1939 | | FR | 1 293 043 | 4/1962 |
| CH | 211877 | 1/1941 | | FR | 2 568 295 | 1/1986 |
| CH | 690242 A5 | 6/2000 | | FR | 2 630 149 | 10/1989 |
| DE | 1 212 275 | 3/1966 | | FR | 2 637 932 A1 | 4/1990 |
| DE | 7102476 | 1/1971 | | FR | 2 675 174 | 10/1992 |
| DE | 1 534 278 | 11/1971 | | FR | 2 691 491 | 11/1993 |
| DE | 2 159 042 | 11/1971 | | FR | 2 697 275 | 4/1994 |
| DE | 2 205 232 | 8/1973 | | FR | 2 712 329 A1 | 5/1995 |
| DE | 7402354 | 1/1974 | | FR | 2 781 513 A1 | 1/2000 |
| | | | | FR | 2 785 633 A1 | 5/2000 |

| | | |
|---|---|---|
| FR | 2 810 060 A1 | 12/2001 |
| GB | 240629 | 10/1925 |
| GB | 424057 | 2/1935 |
| GB | 585205 | 1/1947 |
| GB | 599793 | 3/1948 |
| GB | 636423 | 4/1950 |
| GB | 812671 | 4/1959 |
| GB | 1127915 | 10/1968 |
| GB | 1171337 | 11/1969 |
| GB | 1237744 | 6/1971 |
| GB | 1275511 | 5/1972 |
| GB | 1430423 | 3/1976 |
| GB | 2117813 A | 10/1983 |
| GB | 2126106 A | 3/1984 |
| GB | 2243381 A | 10/1991 |
| GB | 2256023 A | 11/1992 |
| JP | 54-65528 | 5/1979 |
| JP | 57-119056 | 7/1982 |
| JP | 57-185110 | 11/1982 |
| JP | 59-186336 | 11/1984 |
| JP | 3-169967 | 7/1991 |
| JP | 4-106264 | 4/1992 |
| JP | 4-191001 | 7/1992 |
| JP | 5-148984 | 6/1993 |
| JP | 6-56310 | 5/1994 |
| JP | 6-146553 | 5/1994 |
| JP | 6-320510 | 11/1994 |
| JP | 7-076923 | 3/1995 |
| JP | 7-180333 | 7/1995 |
| JP | 7-300979 | 11/1995 |
| JP | 7-310426 | 11/1995 |
| JP | 8-109734 | 4/1996 |
| JP | 9-38906 | 2/1997 |
| JP | 9-88315 | 3/1997 |
| JP | 2000 179137 | 6/2000 |
| JP | P2000 226932 | 8/2000 |
| JP | 2001 173213 | 6/2001 |
| JP | 2001 179710 | 7/2001 |
| JP | 2001 254503 | 9/2001 |
| JP | 2001 260107 | 9/2001 |
| JP | P2001 329681 | 11/2001 |
| NL | 7601773 | 8/1976 |
| NO | 157871 | 7/1984 |
| NO | 305614 | 5/1995 |
| PL | 34931 U | 11/1974 |
| SE | 372 051 | 5/1973 |
| SE | 450 141 | 6/1984 |
| SE | 501 014 C2 | 10/1994 |
| SE | 502 994 | 3/1996 |
| SE | 506 254 C2 | 11/1997 |
| SE | 509 059 | 6/1998 |
| SE | 509 060 | 6/1998 |
| SE | 512 290 | 12/1999 |
| SE | 512 313 | 12/1999 |
| SE | 0000200-6 | 7/2001 |
| SU | 363795 | 11/1973 |
| WO | WO 84/02155 | 6/1984 |
| WO | WO 87/03839 A1 | 7/1987 |
| WO | WO 92/17657 | 10/1992 |
| WO | WO 93/13280 | 7/1993 |
| WO | WO 94/01628 | 1/1994 |
| WO | WO 94/26999 | 11/1994 |
| WO | WO 96/27719 | 9/1996 |
| WO | WO 96/27721 | 9/1996 |
| WO | WO 96/30177 A1 | 10/1996 |
| WO | WO 97/19232 A1 | 5/1997 |
| WO | WO 97/47834 | 12/1997 |
| WO | WO 98/22677 A1 | 5/1998 |
| WO | WO 98/24994 | 6/1998 |
| WO | WO 98/24995 | 6/1998 |
| WO | WO 98/38401 A1 | 9/1998 |
| WO | WO 99/40273 A1 | 8/1999 |
| WO | WO 99/66151 | 12/1999 |
| WO | WO 99/66152 | 12/1999 |
| WO | WO 00/06854 | 1/2000 |
| WO | WO 00/20705 A1 | 4/2000 |
| WO | WO 00/20706 A1 | 4/2000 |
| WO | WO 00/66856 A1 | 11/2000 |
| WO | WO 01/02669 A1 | 1/2001 |
| WO | WO 01/07729 A1 | 2/2001 |
| WO | 01/66877 A1 | 9/2001 |
| WO | WO 00/66876 A1 | 9/2001 |
| WO | WO 01/75247 A1 | 10/2001 |
| WO | WO 01/77461 A1 | 10/2001 |
| WO | 01/98604 A1 | 12/2001 |
| WO | WO 01/96688 A1 | 12/2001 |
| WO | WO 01/98603 A2 | 12/2001 |
| WO | WO 02/060691 A1 | 8/2002 |

OTHER PUBLICATIONS

Knight's American Mechanical Dictionary, Hurd and Houghton: New York (1876), p. 2051.
Opposition EP 0.698,162 B1—Facts-Grounds-Arguments, dated Apr. 1, 1999, pp. 1-56.
Opposition II EP 0.698,162 B1—Facts-Grounds-Arguments, dated Apr. 30, 1999, (17pages)—with translation (11 pages).
Opposition I: Unilin Decor N.V./Välinge Aluminum AB, communication dated Jun. 8, 1999 to European Patent Office, pp. 1-2.
Opposition I: Unilin Decor N.V./Välinge Aluminum AB, communication dated Jun. 16, 1999 to European Patent Office, pp. 1-2.
FI Office Action dated Mar. 19, 1998.
NO Office Action dated Dec. 22, 1997.
NO Office Action dated Sep. 21, 1998.
Opposition EP 0.877.130 B1—Facts—Arguments, dated Jun. 28, 2000, pp. 1-13.
RU Application Examiner Letter dated Sep. 26, 1997.
NZ Application Examiner Letter dated Oct. 21, 1999.
European prosecution file history to grant, European Patent No. 94915725.9—2303/0698162, grant date Sep. 16, 1998.
European prosecution file history to grant, European Patent No. 98106535.2—2303/0855482, grant date Dec. 1, 1999.
European prosecution file history to grant, European Patent No. 98201555.4—2303/0877130, grant date Jan. 26, 2000.
Communication of Notices of Intervention by E.F.P. Floor Products dated Mar. 17, 2000 in European Patent Application 0698162, pp. 1-11 with annex pp. 1-21.
Response to the E.F.P. Floor Products intervention dated Jun. 28, 2000, pp. 1-5.
Letters from the Opponent dated Jul. 26, 2001 and Jul. 30, 2001 including Annexes 1 to 3.
Communication from European Patent Office dated Sep. 20, 2001 in European Patent No. 0698162, pp. 1-2 with Facts and Submissions Annex pp. 1-18, Minutes Annex pp. 1-11, and Annex I to VI.
Communication from Swedish Patent Office dated Sep. 21, 2001 in Swedish Patent No. 9801986-2, pp. 1-3 in Swedish with forwarding letter dated Sep. 24, 2001 in English.
Välinge, Fibo-Trespo Brochure, Distributed at the Domotex Fair in Hannover, Germany, Jan. 1996.
Träindustrins Handbook "Snickeriarbete", 2nd Edition, Malmö 1952, pp. 826, 827, 854, and 855, published by Teknografiska Aktiebolaget, Sweden.
"Träbearbetning", Anders Grönlund, 1986, ISBN 91-970513-2-2, pp. 357-360, published by Institutet for Trateknisk Forskning, Stockholm, Sweden.
Drawing Figure 25/6107 from Buetec Gmbh dated Dec. 16, 1985.
Pamphlet from Serexhe for Compact-Praxis, entitled "Selbst Teppichböden, PVC und Parkett verlegen", Published by Compact Verlag, München, Germany 1985, pp. 84-87.
Pamphlet from Junckers Industrser A/S entitled"Bøjlesystemet til Junckers boliggulve" Oct. 1994, , Published by Junckers Industrser A/S, Denmark.
Pamphlet from Junckers Industrser A/S entitled "The Clip System for Junckers Sports Floors", Annex 7, 1994, Published by Junckers Industrser A/S, Denmark.

Pamphlet from Junckers Industrser A/S entitled "The Clip System for Junckers Domestic Floors", Annex 8, 1994, Published by Junckers Industrser A/S, Denmark.

Fibo-Trespo Alloc System Brochure entitled "Opplæring OG Autorisasjon", pp. 1-29, Fibo-Trespo.

"Revolution bei der Laminatboden-Verl", boden wand decke, vol. No. 11 of 14, Jan. 10, 1997, p. 166.

Kährs Focus Extra dated Jan. 2001, pp. 1-9.

Brochure for CLIC Laminate Flooring, Art.-Nr. 110 11 640.

Brochure for Laminat-Boden "Clever-Click", Parador® Wohnsysteme.

Brochure for PERGO®, CLIC Laminate Flooring, and Prime Laminate Flooring from Bauhaus, The Home Store, Malmö, Sweden.

Darko Pervan, U.S. Appl. No. 09/714,514 entitled "*Locking System and Flooring Board*" filed Nov. 17, 2000.

Darko Pervan et al. U.S. Appl. No. 10/235,940 entitled "*Flooring and Method for Laying and Manufacturing the Same*" filed Sep. 6, 2002.

Darko Pervan, U.S. Appl. No. 10/413,478 entitled "Mechanical Locking System for Floating Floor" filed Apr. 15, 2003.

Darko Pervan, U.S. Appl. No. 10/413,479 entitled "Floorboards for Floating Floor" filed Apr. 15, 2003.

Tony Pervan, U.S. Appl. No. 10/430,273 entitled "System for Joining Building Panels" filed May 7, 2003.

Darko Pervan, U.S. Appl. No. 10/730,131 entitled "Floorboards, Flooring Systems and Methods for Manufacturing and Installation Thereof" filed Dec. 9, 2003.

Darko Pervan, U.S. Appl. 10/768,677 entitled "Mechanical Locking System for Floorboards" filed Feb. 2, 2004.

Darko Pervan, U.S. Appl. No. 10/708,314 entitled "Floorboard and Method of Manufacturing Thereof" filed Feb. 24, 2004.

Darko Pervan et al., U.S. Appl. No. 10/508,198 entitled "Floorboards With Decorative Grooves" filed Sep. 20, 2004.

Darko Pervan, U.S. Appl. No. 10/509,885 entitled "Mechanical Locking System for Floorboards" filed Oct. 4, 2004.

Darko Pervan, U.S. Appl. No. 10/510,580 entitled "Floorboards for Floorings" filed Oct. 8, 2004.

Darko Pervan, U.S. Appl. No. 10/970,282 entitled "Mechanical Locking System for Floor Panels" filed Oct. 22, 2004.

Darko Pervan, U.S. Appl. No. 11/000,912 entitled "Floorboard, System and Method for Forming a Flooring, and Flooring Formed Thereof" filed Dec. 2, 2004.

Darko Pervan, U.S. Appl. No. 11/008,213 entitled "Metal Strip for Interlocking Floorboard and a Floorboard Using Same" filed Dec. 10, 2004.

Darko Pervan, U.S. Appl. No. 11/034,059 entitled "Floor Covering and Locking System" filed Jan. 13, 2005.

Darko Pervan, U.S. Appl. No. 11/034,060 entitled "Floor Covering and Locking System" filed Jan. 13, 2005.

Darko Pervan, U.S. Appl. No. 10/906,356 entitled "Building Panel With Compressed Edges and Method of Making Same" filed Feb. 15, 2005.

Darko Pervan, U.S. Appl. No. 11/092,748 entitled "Mechanical Locking System for Panels and Method of Installing Same" filed Mar. 30, 2005.

Darko Pervan, U.S. Appl. No. 10/908,658 entitled "Mechanical Locking System for Floor Panels" filed May 20, 2005.

Darko Pervan et al, U.S. Appl. No. 11/161,520 entitled "Method of Making a Floorboard and Method of Making a Floor With the Floorboard" filed Aug. 6, 2005.

Darko Pervan et al, U.S. Appl. No. 11/161,520 entitled "Method of Making a Floorboard and Mehtod of Making a Floor With the Floorboard" filed Aug. 6, 2005.

Darko Pervan et al, U.S. Appl. No. 11/163,085 entitlted "Appliance and Method for Surface Treatment of a Board Shaped Material and Floorboard" filed Oct. 4, 2005.

* cited by examiner

FLOORBOARDS WITH DECORATIVE GROOVES

CROSS-REFERENCE TO RELATED APPLICATIONS

The present application claims the benefit of U.S. provisional Application No. 60/372,082, filed in the U.S. on Apr. 15, 2002 and is a continuation-in-part of PCT International Application No. PCT/SE02/01731 filed on Sep. 20, 2002 and which designated the U.S., the entire contents of both applications being herein incorporated by reference.

BACKGROUND OF THE INVENTION

1. Field of the Invention

The invention relates to floorboards provided with decorative grooves and methods for making such floorboards. The invention is particularly suited for use in mechanical locking systems integrated with the floorboard of the type described and shown, for example, in WO9426999, WO9966151, WO9966152, SE 0100100-7 and SE0100101-5 (owned by Välinge Aluminium AB), but is also usable in optional joint systems which can be used to join floors.

More specifically, the invention relates above all to floors of the type having a core and a decorative surface layer on the upper side of the core.

The present invention is particularly suitable for use in floating floors, which are formed of floorboards which are joined mechanically with a joint system integrated with the floorboard, i.e., mounted at the factory, and are made up of one or more preferably moisture-proof upper layers of decorative laminate or decorative plastic material, an intermediate core of wood-fiber-based material or plastic material and preferably a lower balancing layer on the rear side of the core. The following description of known techniques, problems of known systems and objects and features of the invention will therefore, as non-restrictive examples, be aimed above all at this field of application and in particular laminate flooring formed as rectangular floorboards intended to be mechanically joined on both long sides and short sides. However, it should be emphasized that the invention can be used in optional floorboards with optional joint systems, where the floorboards have a core and at least one surface layer and where these two parts have different decorative properties in the form of color, pattern, structure or the like. The invention can thus also be applicable to, for instance, floors with one or more surface layers of wood.

2. Background of the Invention

Laminate flooring usually consists of a core of a 6–9 mm fiberboard, a 0.2–0.8 mm thick upper decorative surface layer of laminate and a 0.1–0.6 mm thick lower balancing layer of laminate, plastic, paper, or like material. The surface layer provides appearance and durability to the floorboards. The core provides stability, and the balancing layer keeps the board plane when the relative humidity (RH) varies during the year. The floorboards are laid floating, i.e., without gluing, on an existing subfloor which does not have to be completely smooth or plane. Any irregularities are eliminated by means of base material in the form of e.g. board or foam which is placed between the floorboards and the subfloor. Traditional hard floorboards in floating flooring of this type are usually joined by means of glued tongue-and-groove joints (i.e., joints involving a tongue on one floorboard and a tongue groove on an adjoining floorboard) on the long sides and the short sides. When laying the floor, the boards are brought together horizontally, whereby a projecting tongue along the joint edge of one board is introduced into a tongue groove along the joint edge of an adjoining board. The same method is used on the long side as well as on the short side.

In addition to such traditional floors, which are joined by means of glued tongue-and-groove joints, floorboards have recently been developed which do not require the use of glue and instead are joined mechanically by means of so-called mechanical joint systems. These mechanical joint systems lock the boards horizontally and vertically. The mechanical joint systems can be formed by machining the core of the board. Alternatively, parts of the locking system can be formed of a separate material, which is integrated with the floorboard, i.e., joined with the floorboard even in connection with the manufacture thereof.

The main advantages of floating floors with mechanical joint systems are that they can easily and quickly be laid by various combinations of inward angling and snapping-in. They can also easily be taken up again and used once more at a different location. A further advantage of the mechanical joint systems is that the edge portions of the floorboards can be made of materials which need not have good gluing properties. The most common core material is a fiberboard with high density and good stability usually called HDF—High Density Fiberboard. Sometimes also MDF—Medium Density Fiberboard—is used as core. As a rule, these core materials are of high quality and often have an attractive surface which can resist penetration of moisture.

Laminate flooring and also many other floorings with a surface layer of plastic, wood, veneer, cork and the like are made by the surface layer and the balancing layer being applied to a core material. This application may take place by gluing a previously manufactured decorative layer, for instance when the fiberboard is provided with a decorative high pressure laminate which is made in a separate operation where a plurality of impregnated sheets of paper are compressed under high pressure and at a high temperature. The currently most common method when making laminate flooring, however, is direct laminating which is based on a more modern principle where both manufacture of the decorative laminate layer and the fastening to the fiberboard take place in one and the same manufacturing step. Impregnated sheets of paper are applied directly to the board and pressed together under pressure and heat without any gluing.

In addition to these two methods, a number of other methods are used to provide the core with a surface layer. A decorative pattern can be printed on the surface of the core, which is then, for example, coated with a wear layer. The core can also be provided with a surface layer of wood, veneer, decorative paper or plastic sheeting, and these materials can then be coated with a wear layer.

As a rule, the above methods result in a floor element in the form of a large board which is then sawn into, for instance, ten floor panels, which are then machined to floorboards. The above methods can in some cases result in completed floor panels and sawing is then not necessary before the machining to completed floorboards is carried out. Manufacture of individual floor panels usually takes place when the panels have a surface layer of wood or veneer.

In all cases, the above floor panels are individually machined along their edges to floorboards. The machining of the edges is carried out in advanced milling machines where the floor panel is exactly positioned between one or more chains and bands mounted, so that the floor panel can be moved at high speed and with great accuracy past a number of milling motors, which are provided with diamond cutting tools or metal cutting tools, which machine the edge of the floor panel. By using several milling motors operating at different angles, advanced joint geometries can be formed at speeds exceeding 100 m/min and with an accuracy of ±0.02 mm.

Definition of Some Terms

In the following text, the top visible surface of the installed floorboard is called "front side", while the opposite side of the floorboard, facing the subfloor, is called "rear side". The sheet-shaped starting material that is used is called "core". When the core is coated with a surface layer closest to the front side and preferably also a balancing layer closest to the rear side, it forms a semimanufacture which is called a "floor element". In the case where the "floor element" in a subsequent operation is divided into a plurality of panels, each of the panels are called a "floor panel". When the floor panels are machined along their edges so as to obtain their final shape with the locking system, they are called "floorboards". By "surface layer" are meant all layers applied to the core closest to the front side and covering preferably the entire front side of the floorboard. By "decorative surface layer" is meant a layer which is mainly intended to give the floor its decorative appearance. "Wear layer" relates to a layer which is mainly adapted to improve the durability of the front side. In laminate flooring, this layer includes a transparent sheet of paper with an admixture of aluminum oxide which is impregnated with melamine resin. By "reinforcement layer" is meant a layer which is mainly intended to improve the capability of the surface layer of resisting impact and pressure and, in some cases, compensating for the irregularities of the core so that these will not be visible at the surface. In high pressure laminates, this reinforcement layer usually includes brown kraft paper which is impregnated with phenol resin. By "horizontal plane" is meant a plane which extends parallel with the outer part of the surface layer. Immediately juxtaposed upper parts of two neighboring joint edges of two joined floorboards together define a "vertical plane" perpendicular to the horizontal plane.

The outer parts of the floorboard at the edge of the floorboard between the front side and the rear side are called "joint edge". As a rule, the joint edge has several "joint surfaces" which can be vertical, horizontal, angled, rounded, beveled etc. These joint surfaces exist on different materials, for instance laminate, fiberboard, wood, plastic, metal (especially aluminum) or sealing material. By "joint edge portion" are meant the joint edge of the floorboard and part of the floorboard portions closest to the joint edge. By "decorative joint portion" is generally meant part of the top surface which is intended to resemble a visible joint between, for instance, stone or wood material.

By "joint" or "joint system" are meant coacting connecting means which connect the floorboards vertically and/or horizontally.

The above techniques can be used to manufacture laminate floorings which are highly natural copies of wooden flooring. In recent years, imitations of stones, tiles and the like have become more and more common. In this context, it is tried to manufacture decorative joint portions between stones and tiles which should be as natural as possible. They should have decoration and structure other than those of the stone material and should also be somewhat lower with respect to the horizontal plane to resemble an embedded joint between two stones or tiles. The techniques used to manufacture these decorative joint portions are expensive and do not provide a natural appearance. It should be possible to increase the market for these types of flooring significantly if decorative joint edge portions could be made in a simpler and less expensive manner and with a more natural appearance.

Conventional Techniques and Problems Thereof

When making laminate flooring with decorative and embedded joint portions, the starting material is a decorative paper with printed joint edge portions. This paper is usually impregnated with melamine resin. Uncontrolled swelling takes place in this operation. In the subsequent lamination, the decorative impregnated paper is placed on a core. A transparent wear layer is preferably placed over this decorative paper and then lamination takes place against an embossed metal sheet, in which joint portions are formed which usually have a structure different from that of the remaining part of the metal sheet and where joint portions are designed so that a depression of 0.2 mm can be provided in connection with laminating. The result is a floor element whose front side has an embedded joint pattern corresponding to the intended joint portions between the tiles.

This manufacturing method suffers from a number of problems which are above all related to difficulties in positioning the decorative paper and metal sheets in connection with laminating and the difficulty in positioning floor element and floor panels in the subsequent sawing and machining of the joint edges.

The metal sheet must be positioned with great accuracy relative to the decorative paper. Even if this is carried out with extremely great accuracy, it is not possible to eliminate the uncontrolled swelling in connection with impregnating. This swelling also causes problems in the sawing operation and machining of joint edges. The result of these swelling and positioning problems is that decoration and embossing do not agree with each other and that the decorative embedded joint portions vary between different floorboards, which results in an unnatural appearance.

To counteract these problems, different methods have been used. One method is to limit the format of the floor element so as to thus reduce the maximum deviation in connection with swelling. Special marks are made on the decorative paper which can then be read optically in connection with pressing and sawing. Then the boards are aligned as accurately as possible and individual adjustment of the sawblades can be made for each floor element.

The main disadvantage of this method is high cost, low capacity and extremely great remaining deviation between decoration, embossing and joint edge in the completed floorboard.

It is also difficult to provide a deep depression in high pressure laminate without damaging the decorative paper. Depressing of joint portions in connection with direct lamination results in fibers of the core being compressed. The compressed fibers can later, if moisture penetrates, swell more than normal and cause damage to the joint edge.

OBJECTS AND SUMMARY

An object of the present invention is to eliminate or significantly reduce one or more of the problems occurring in connection with manufacture and use of floorboards with decorative embedded joint portions. A further object of the invention is to provide a rational and cost-efficient manufacturing method for manufacturing floor elements, floor panels and floor boards.

According to one embodiment of the invention, the decorative joint portions are made in connection with the machining of the joint edges of the floor panel. Laminating and sawing can then take place without any specific requirements as to alignment, and swelling problems do not occur. The decorative and embedded joint portion can be provided by part of the decorative surface layer being removed so that the reinforcing layer of the laminate becomes visible. With suitable working machines and diamond cutting tools, it is possible to make a partial removal of the surface layer with an accuracy of 0.01 mm. The decorative layer can thus be removed partially and the reinforcing layer can be uncovered. This reinforcing layer can be given an appearance and structure that deviate from the remaining surface of the floorboard and can thus constitute an embedded decorative joint portion.

That embodiment is particularly suited for use in the joint edge portions of the floorboards, but one or more decorative embedded grooves can also be arranged at an optional location between the joint edge portions of the floorboards.

Thus the floorboard can have a surface that includes a plurality of surface portions with decorative embedded grooves between these portions, thereby forming a surface pattern with a plurality of tiles or elongate blocks or the like.

The invention is also particularly suited for use with floorboards having mechanical joint systems which allow exact positioning of the floorboards relative to each other without visible joint gaps in the decorative joint portion. Such locking systems give the decorative joint portion a natural appearance.

According to a first aspect of the invention, a system is provided for making a decorative joint edge portion between two adjoining edges of floorboards which have a core and a surface layer which is arranged on the upper side of the core and consists of at least one decorative layer and, under the decorative surface layer, a reinforcing layer is arranged. The floorboards have at their adjoining joint edge portions connectors for connecting the floorboards with each other in the vertical direction. The joint edge portions, adjoining each other, of the floorboards have a surface that includes the reinforcing layer and that is essentially parallel to the front side.

According to this aspect of the invention, the decorative visible reinforcing layer can be made in a number of different ways. The kraft paper which constitutes the reinforcing layer can be wholly or partly stained in the parts that will later constitute the decorative joint portions. The partial staining can take place with overmeasure so as not to cause positioning problems in the rest of the production process. Phenol or melamine resin that is used in impregnation can be stained. Decorative reinforcing layers can be arranged both in manufacture of floorboards with surface layers of high pressure laminate and direct laminate. Surface layers of plastic or several layers of decorative veneer layers can in the same way be machined for the purpose of providing decorative joint portions.

The machining extends preferably to a depth which is at least 0.1 times the thickness of the surface layer, from the upper side of the surface layer. The extent of the machining starting at the joint plane and inwards to the floorboard is preferably also at least 0.1 times the thickness of the floorboard. Still more preferably, the uncovered reinforcing layer extends, starting at the joint plane, a distance corresponding to at least 0.25 times the thickness of the floorboard.

According to a second aspect of the invention, the core can be used to create the decorative embedded joint edge portion, either by the core having suitable properties, or by part of or the entire core before laminating, or after machining, being machined in a convenient manner so as to provide a decorative appearance or better properties in order to counteract moisture or wear.

Mechanical joint systems as a rule require the use of relatively qualified core materials to provide a mechanical joint system with sufficient strength and a good function. Such high quality core materials, however, are not used for decoration purposes since they are concealed by the surface layer.

According to the second aspect of the invention, the decorative joint portion is formed by the surface layer being removed and the core being uncovered within areas that are to constitute the decorative joint portion.

HDF and plastic materials are particularly convenient in this context. HDF boards can, for instance, be stained using different colorants even in manufacture, and portions of the core can be reinforced by impregnating before or after laminating, using chemicals such as melamine, phenol, polyurethane and the like. With suitable machining, the visible core surface can be machined with high precision. The visible joint edges can be machined to a number of varying shapes, such as rounded, beveled at different angles and the like. Grooves can be made in the core before or after laminating, which are filled with suitable filling materials which have more suitable properties than does the core as regards, for instance, moisture and decoration. These filling materials can be placed in the core in the areas which will then constitute visible portions when the surface layer is removed or when the joint edge is given its final shape.

DETAILED DESCRIPTION OF PREFERRED EMBODIMENTS

Figure 1A:
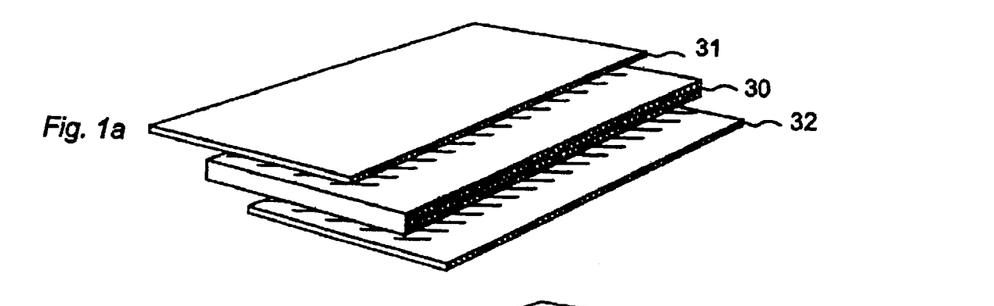
FIGS. 1a–d illustrate conventional steps of manufacture of a floorboard.
Figure 1B:
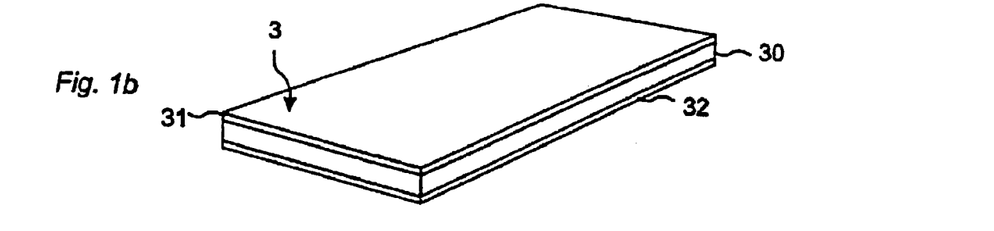
Figure 1C:
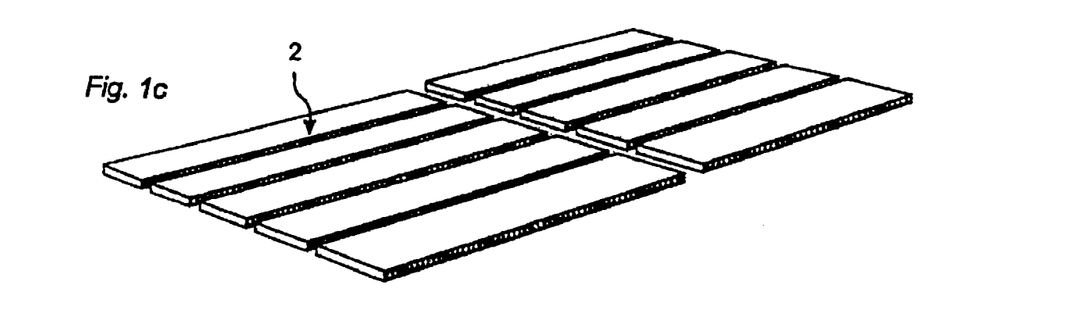
Figure 1D:
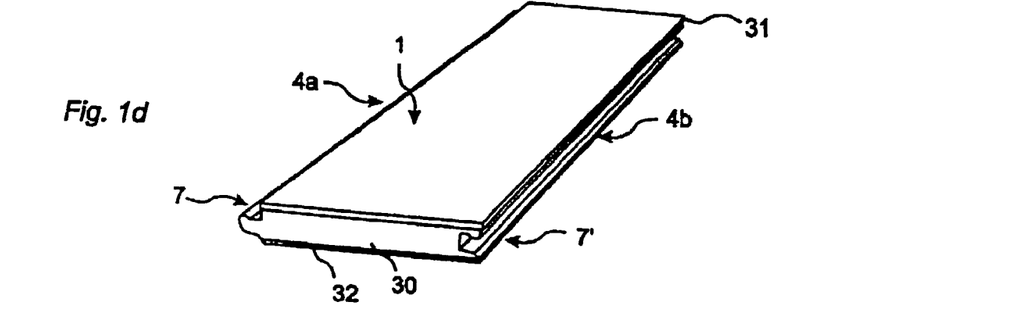

FIGS. 1a–d show in four steps manufacture of a floorboard. FIG. 1a shows the three basic components: surface layer 31, core 30 and balancing layer 32. FIG. 1b shows a floor element 3, where surface layer and balancing layer have been applied to the core. FIG. 1c shows how floor panels 2 are made by dividing the floor element. FIG. 1d shows how the floor panel 2 after machining of its edges obtains its final shape and becomes a completed floorboard 1 with a joint system 7, 7', which in this case is mechanical, on the long sides 4a, 4b.

Figure 2A:
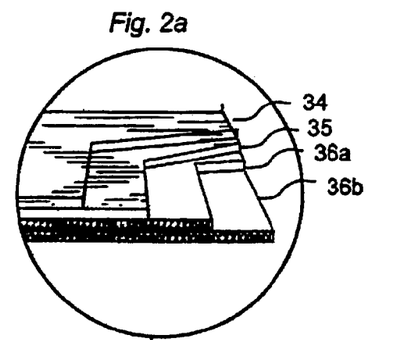
FIGS. 2a–e illustrate the composition of known laminate flooring with a surface of high pressure laminate and direct laminate.
Figure 2B:
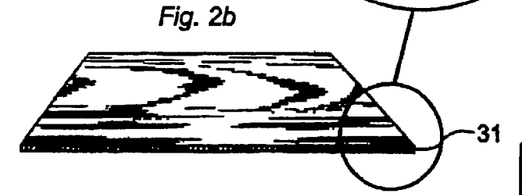
Figure 2C:
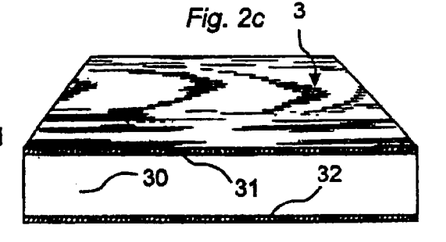

FIG. 2a shows manufacture of high pressure laminate. A wear layer 34 of a transparent material with great wearing strength is impregnated with melamine with aluminum oxide added. A decorative layer 35 of paper impregnated with melamine is placed under this layer 34. One or more reinforcing layers 36a, 36b of core paper impregnated with phenol are placed under the decorative layer 35 and the entire packet is placed in a press where it cures under pressure and heat to an about 0.5–0.8 mm thick surface layer 31 of high pressure laminate. FIG. 2c shows this surface layer 31 glued together with a balancing layer 32 to a core 30 to constitute a floor element 3.

Figure 2D:
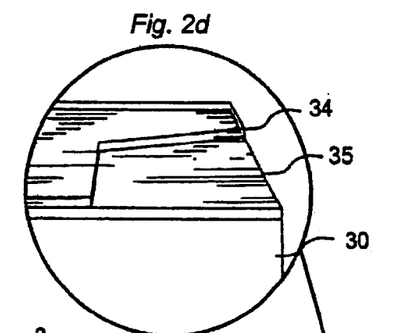
Figure 2E:
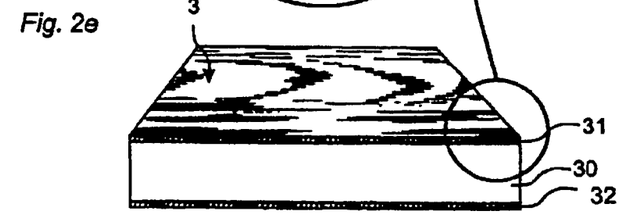

FIGS. 2d and 2e illustrate direct lamination. A wear layer 34 in the form of an overlay and a decorative layer 35 of decoration paper is placed directly on a core 30, after which all three parts and, optionally, also a rear balancing layer 32 are placed in the press where they cure under heat and pressure to form a floor element 3 with a decorative surface layer 31 having a thickness of about 0.2 mm.

Figure 3A:
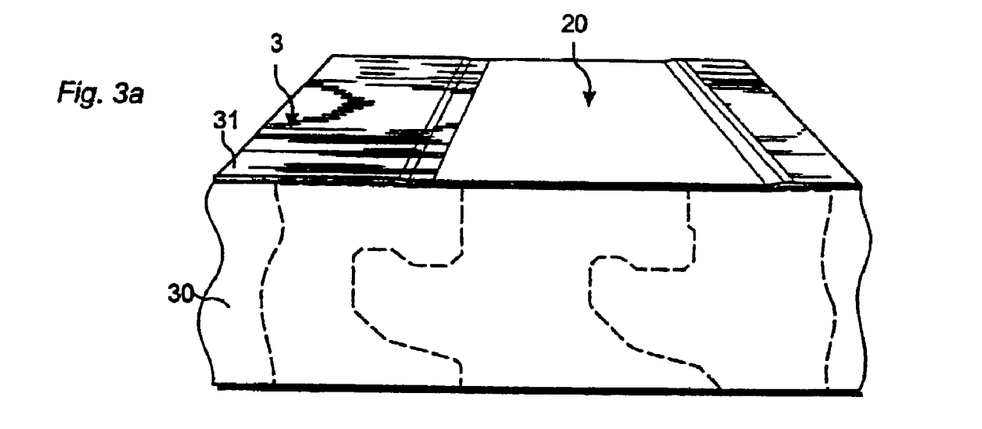
FIGS. 3a–b illustrate examples of conventional ways of manufacture of a decorative joint portion.
Figure 3B:
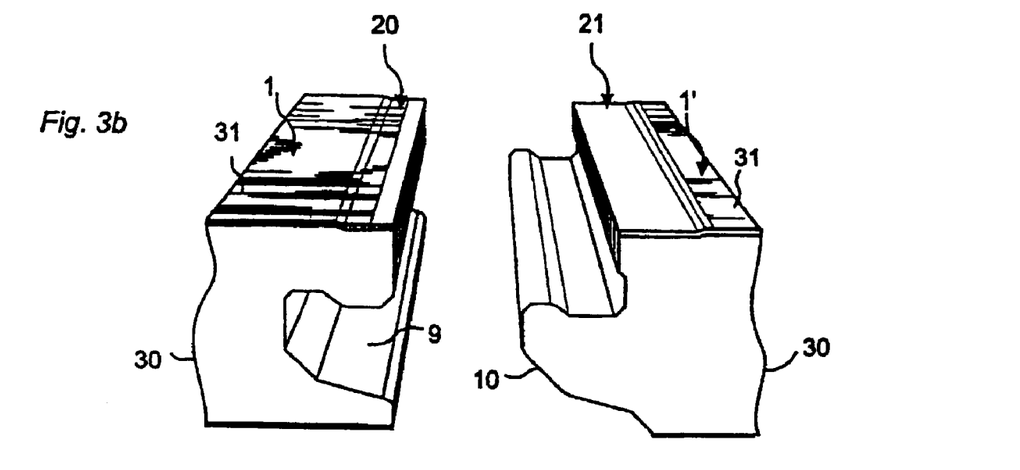

FIGS. 3a–c show manufacture of a conventional decorative joint portion 20, 21. FIG. 3a shows the floor element 3 before sawing. Owing to uncontrolled swelling of the decoration paper, the embossing of the surface has not occurred with sufficient precision. FIG. 3b shows the edges of the floorboard after sawing and machining. Decoration and embossing deviate significantly from the intended position.

Figure 4A:
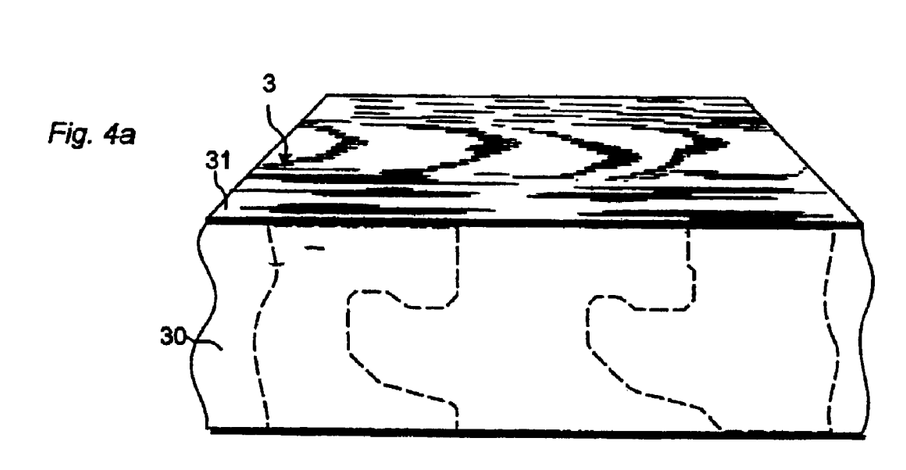
FIGS. 4a–b illustrate a decorative joint portion according to an embodiment of the invention.
Figure 4B:
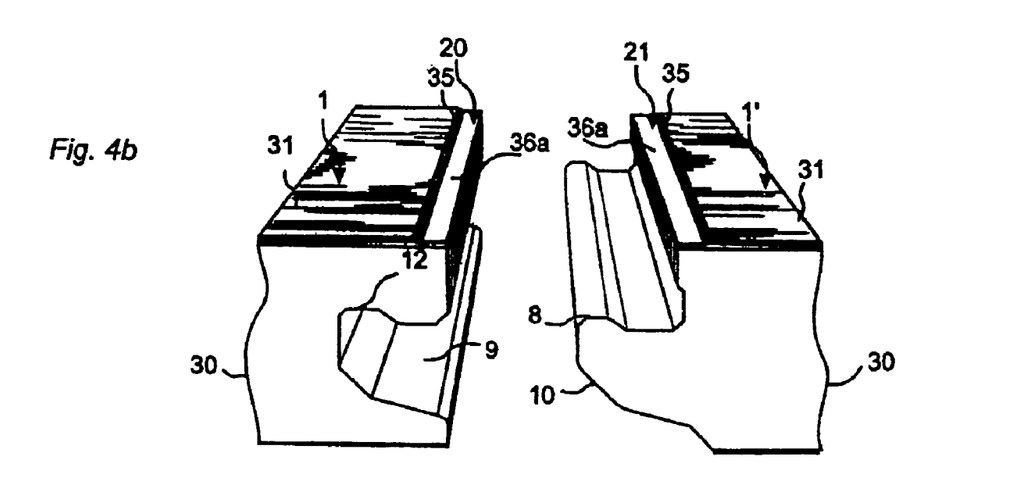

FIGS. 4a–b show manufacture of a decorative joint portion 20, 21 according to an embodiment of the invention. FIG. 4a shows a floor panel after laminating, but before sawing. The decorative joint portion 20, 21 has been made by machining of the joint edge portions. The decorative surface layer 35 has been removed and the reinforcing layer 36a is visible and constitutes the decorative joint edge portion 20, 21 in a plane substantially parallel to the surface layer 31. The edges of the floorboard are provided with a mechanical locking system comprising a groove 9 and a tongue 10 which lock vertically and a locking groove 12 and a locking element 8 which lock horizontally. However, alternative locking mechanisms can be used.

Figure 5A:
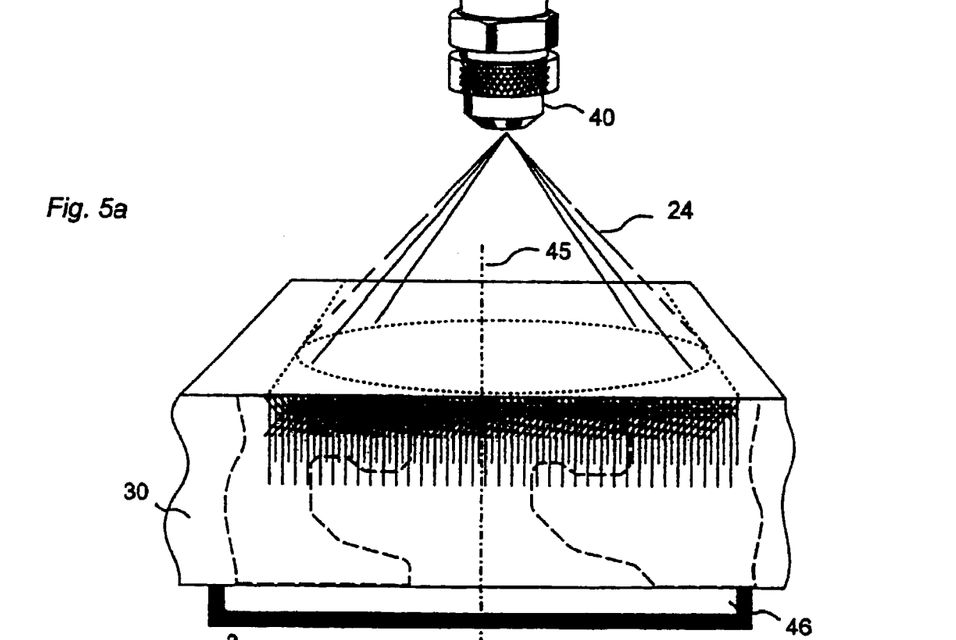
FIGS. 5a–c show an alternative embodiment of the decorative joint portion according to an embodiment of the invention.
Figure 5B:
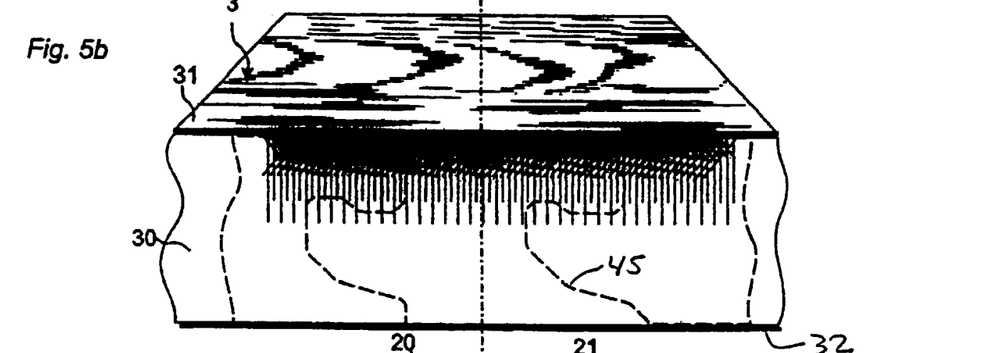
Figure 5C:
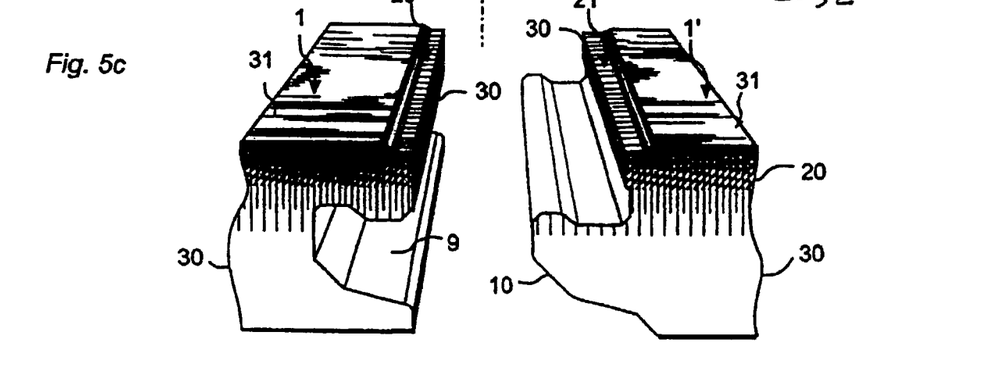

FIGS. 5a–c show in detail the different steps of manufacture for providing a decorative joint edge portion which in this embodiment comprises a wood-fiber-based core 30 which is impregnated and stained before lamination. According to FIG. 5a, the stained impregnating material 24 is applied to the core surface 33 in the portions which in the completed floorboard will constitute the decorative joint edge portions 20, 21. A considerable part of the upper part of the intended joint edge is impregnated, so that a stained and preferably moisture-proof core portion is formed. Vacuum 46 can be used to facilitate penetration of impregnating material.

FIG. 5b shows the floor element 3 with a surface layer 31, a balancing layer 32 and the intended saw cut 45. FIG. 5c shows the edges of the floor panel 1, 1' after sawing and machining. The surface layer 31 has been partially removed so that the stained and uncovered core is visible and constitutes a decorative joint edge portion 20, 21 in a plane substantially parallel to the surface layer 31.

Figure 6A:
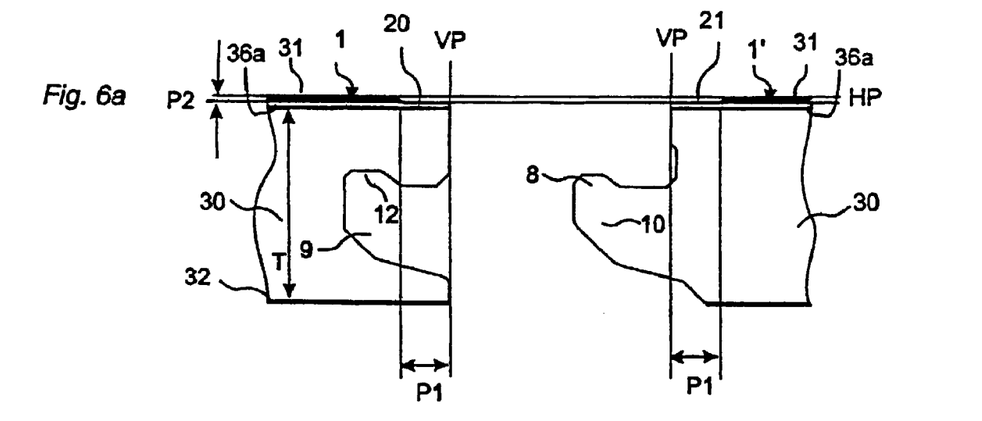
FIGS. 6a–c show different embodiments of the invention.
Figure 6B:
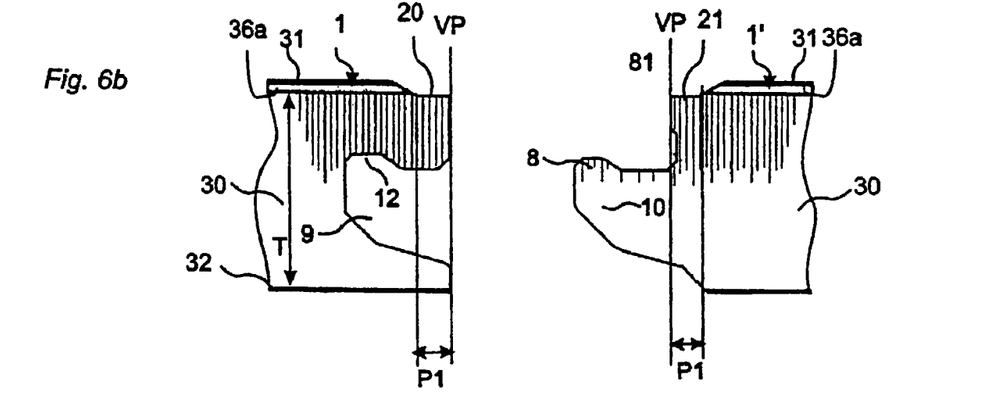
Figure 6C:
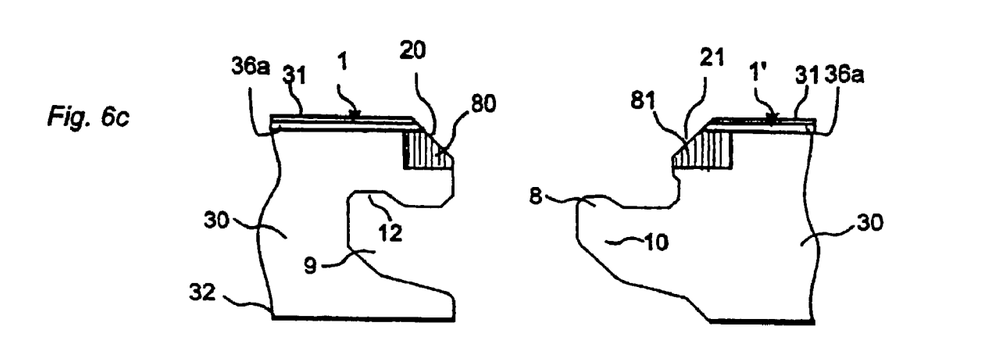

FIGS. 6a–c illustrate preferred embodiments.

The machining of the decorative joint edge portion should according to FIG. 6a extend preferably to a depth P2, starting at the horizontal plane HP, which is at least 0.1 times the thickness of the surface layer 31. The extent P1 of the machining starting at the vertical plane VP and inwards to the floorboard is preferably also at least 0.1 times the thickness T of the floorboard. More preferably, the uncovered reinforcing layer or the uncovered core surface extends, FIG. 6b, starting at the vertical plane VP, a distance corresponding to at least 0.25 times the thickness T of the floorboard. FIG. 6c shows how beveled and reinforced joint portions 80, 81 can be formed by grooves being made in the core before lamination and where these grooves are then filled with a decorative filling material 80, 81 which then, after lamination, is formed by machining to decorative and preferably moisture-proof portions.

By selecting a filling material 80, 81 which in terms of color corresponds to the decoration of the surface, it is possible to provide beveled joint edges which as to appearance resemble, for instance, homogeneous wooden flooring with beveled joint edge portions. Similar grooves can also be made between the joint edge portions.

Figures 7A, 7B, 7C:
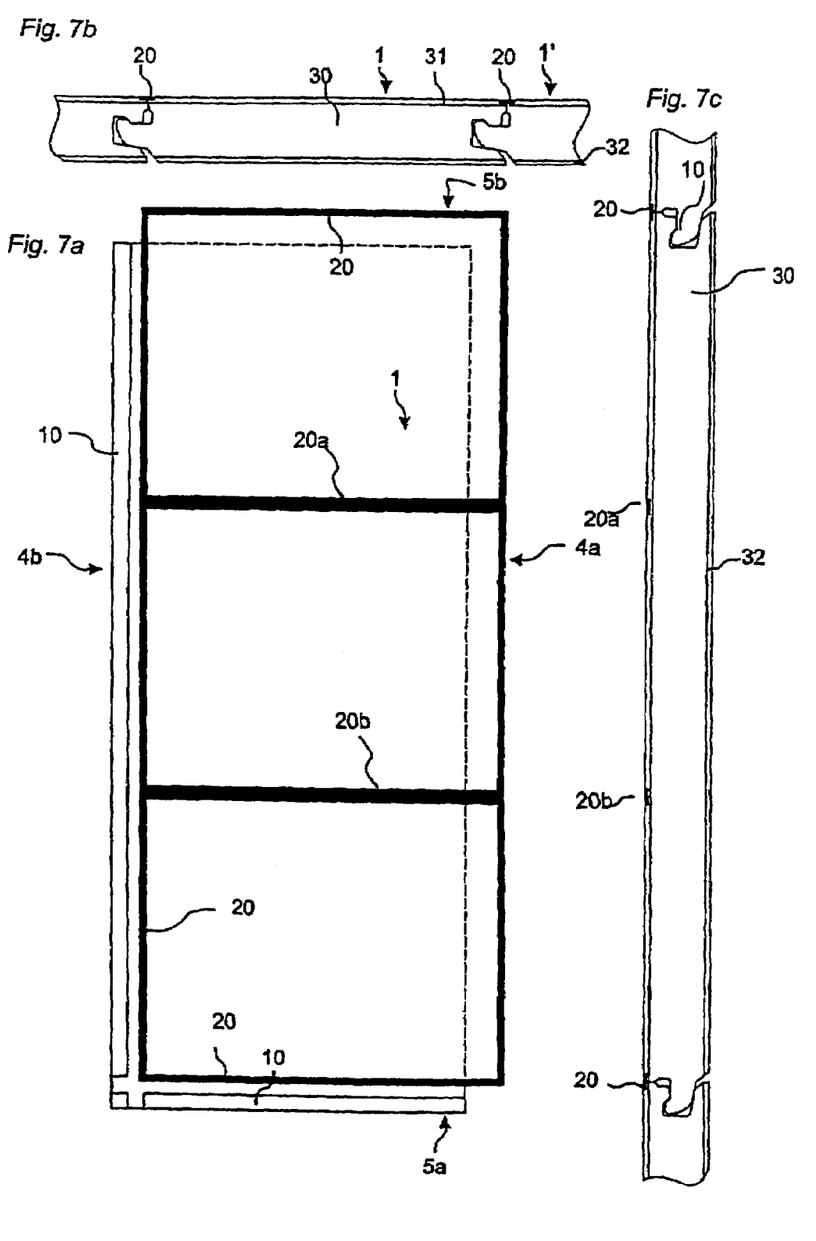
FIGS. 7a–c show an embodiment of a floorboard according to the invention.

FIGS. 7a–c show how decorative joint portions 20a, 20b according to the invention can be manufactured and positioned optionally on the surface of the floorboard between the decorative joint edge portions 20. Preferably, such decorative joint portions 20a and 20b should have a width which is 2 times the width of the joint edge portion 20, so that all decorative joint portions will have the same appearance when the floorboards are joined.

Figure 8:
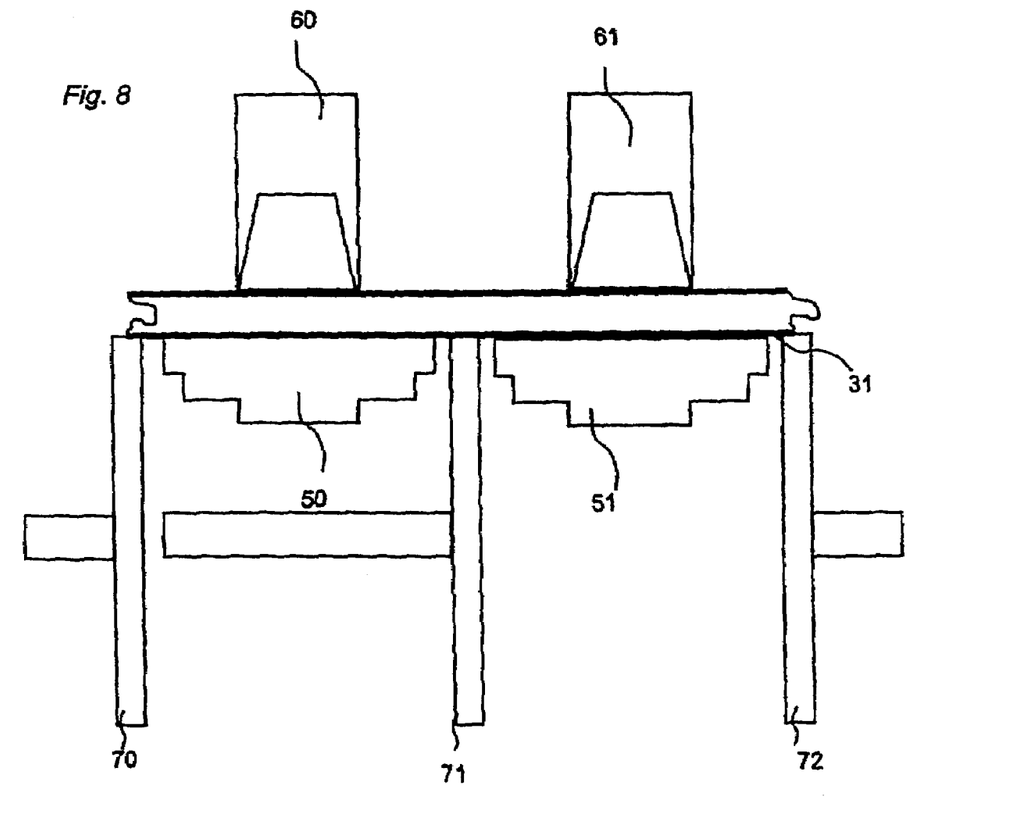
FIG. 8 illustrates a manufacturing method for making decorative grooves.

FIG. 8 shows how the decorative joint portions according to FIG. 7 can be manufactured. The outer joint edge portions 20 of the floorboard are manufactured by the floorboard being passed through milling machines fixed between chains 50, 51 and bands 60, 61, as a rule first through a first machine that machines the long sides, and then through a second machine that machines the short sides. The tools with their respective milling motors 70, 72 are located outside the chains and machine the joint edges. As a rule, use is made of up to five tools on each side, which at different angles machine the joint edges. To manufacture a floorboard efficiently according to the invention with decorative grooves between the joint edges, it must also be possible to perform machining of the surface of the floorboard also between the chains 50, 51. According to an embodiment of the invention, this is most conveniently made by one or more milling motors being provided with extended tool shafts so that the milling motors can be positioned outside the chain while at the same time the tool 71 performs machining between the chains. This is advantageous in particular when manufacture is to be performed of decorative grooves which are close to the joint edges. For efficient manufacture of a floorboard with a mechanical locking system and with decorative joint portions at the joint edges and/or between the joint edges, it is preferable for the number of machining motors and tools on each side to be increased to six. Manufacture can be still more efficient if the number of tools is increased to between six and eight on each side.

Manufacture of floorboards, especially laminate flooring, according to these preferred methods is not known and does not exist today. The decorative grooves can also be made in a separate operation, but this causes a higher cost and considerably greater variation than in the case where all parallel decorative grooves are made in the same machine in one operation. The accuracy of the grooves in depth and side can with the preferred manufacturing method according to FIG. 8 be made with a tolerance of a few hundredths of a millimeter.

Figure 9:
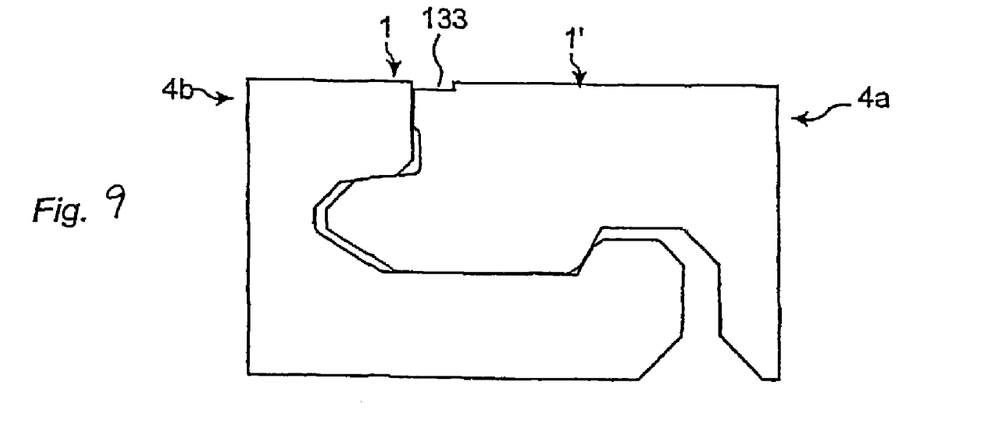
FIG. 9 illustrates an alternative embodiment.

FIG. 9 illustrates another embodiment of the present invention, wherein the long side 4a has in this embodiments a decorative groove 133 which only appears in one joint edge. The advantage is that the joint edge will be less visible than in the case when both joint edges of the boards 1, 1' have decorative grooves. Moreover, manufacture will be simplified. If the locking system on the short side, for instance, has no tongue 10, the floorboards are locked only in the horizontal direction.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A floorboard system comprising a plurality of floorboards, each of the floorboards having a core made of wood-fiber based material and a surface layer which is arranged on an upper side of the core, the surface layer having a substantially planar outer surface facing away from the core and extending in a horizontal plane, said surface layer comprising at least one decorative layer and a reinforcing layer arranged between the decorative layer and the core, each of the floorboards having a connector at opposing edges thereof for connecting the floorboard to an adjacent one of the floorboards in a vertical direction and along a vertical joint plane, wherein at a portion of each of the floorboards adjacent the edges the reinforcing layer is exposed and the exposed portion extends horizontally in a plane that is essentially parallel to the horizontal plane, wherein the reinforcing layer extends substantially the entire area of the decorative layer.

2. The system as claimed in claim 1, wherein the exposed portion of the reinforcing layer extends inwards from the edge a distance which is at least 0.1 times a thickness of the floorboard.

3. The system as claimed in claim 2, wherein the plane of the exposed reinforcing layer is positioned at a distance from the horizontal plane which is at least 0.1 times a thickness of the surface layer.

4. The system as claimed in claim 1, wherein the plane of the exposed reinforcing layer is positioned at a distance from the horizontal plane which is at least 0.1 times a thickness of the surface layer.

5. The system as claimed in claim 1, wherein the connector is formed for mechanical joining of neighboring floorboards about a vertical plane both perpendicular thereto and perpendicular to a front side of the floorboard.

6. The system as claimed in claim 1, wherein the floorboards are quadrilateral and have a surface layer of laminate and a decorative joint edge portion in all their opposite joint edge portions.

7. The system as claimed in claim 1, wherein the connector joins the floorboard with the previously installed floorboard by at least one of inward angling and snapping-in to a locked position.

8. The system as claimed in claim 7, wherein the floorboard is a quadrilateral, the surface layer is of laminate, and the edge portions are impregnated.

9. The floorboard system of claim 1, wherein the exposed reinforcing layer is visible from a front side of the floorboard when the floorboard and the adjacent floorboard are connected.

10. The floorboard system of claim 1, wherein the wood-fiber based material is medium density fiberboard or high density fiberboard.

11. A floorboard comprising:
a core made of wood-fiber based material;
at least one surface layer, the surface layer arranged on an upper side of the core and having a substantially planar outer surface facing away from the core and extending in a horizontal plane, said surface layer including at least one decorative layer and a reinforcing layer arranged between substantially all of the one decorative layer and the core; and
a connector at opposing edges of the floorboard for joining, in a vertical and a horizontal direction, the floorboard with a similar adjacent floorboard,
wherein at a portion of the floorboard adjacent at least one of the opposing edges, the reinforcing layer is exposed and the exposed portion extends horizontally in a plane that is essentially parallel to the horizontal plane.

12. The system as claimed in claim 11, wherein the floorboard is a quadrilateral, the surface layer is of laminate, and the edge portions are impregnated.

13. The system as claimed in claim 11, wherein the connector joins the floorboard with a previously installed floorboard by at least one of inward angling and snapping-in to a locked position.

14. The floorboard of claim 11, wherein the exposed portion of the reinforcing layer is at both opposing edges having the connector.

15. The floorboard of claim 11, wherein the exposed reinforcing layer is visible from a front side of the floorboard when the floorboard and the adjacent floorboard are connected.

16. The floorboard of claim 11, wherein the wood-fiber-based material is medium density fiberboard or high density fiberboard.

17. A system for making a decorative joint portion at two adjoining joint edges of laminate floorboards which each have a core made of wood-fiber based material and a laminate surface layer arranged on an upper side of the core and connectors arranged at said adjoining joint edges for connecting the floorboards with each other in a vertical or horizontal direction, parts of the laminate surface layer closest to said adjoining joint edges forming a horizontal plane and the laminate surface layer comprising an upper layer and an underlying layer, at least two of said adjoining joint edges have exposed surfaces which extend horizontally and comprise the underlying layer and which are essentially parallel to the horizontal plane, wherein the underlying layer extends substantially the entire area of the upper layer.

18. The system as claimed in claim 17, wherein said underlying layer is a reinforcing layer or a decorative layer.

19. The system as claimed in claim 17, wherein the connectors connect the floorboards with each other in the vertical and horizontal directions.

20. The system of claim 17, wherein the underlying layer that forms the surface of the adjoining joint edges is visible from a front side of the floorboard when the floorboard and the adjacent floorboard are connected.

21. The system of claim 17, wherein the wood-fiber-based material is medium density fiberboard or high density fiberboard.

22. A laminate floorboard comprising a core made of wood-fiber based material and a laminate surface layer arranged on an upper side of the core and connectors arranged at opposite joint edges of the floorboard for joining the floorboard with an essentially identical floorboard in the vertical or horizontal direction, parts of the laminate surface layer closest to said joint edges forming a horizontal plane, and the laminate surface layer comprising an upper layer and an underlying layer, at least two of the joint edges of the floorboards have exposed surfaces which extend horizontally and comprise the underlying layer and which are essentially parallel to the horizontal plane, wherein the underlying layer extends substantially the entire area of the upper layer.

23. The system of claim 22, wherein the exposed underlying layer is visible from a front side of the floorboard when the floorboard and the adjacent floorboard are connected.

24. The system of claim 22, wherein the wood-fiber-based material is medium density fiberboard or high density fiberboard.

* * * * *